May 10, 1932. A. A. SMALLHOUSE 1,857,666
COMBINATION CHECK, PILOT, AND UNLOADING VALVE FOR COMPRESSED AIR SYSTEMS
Filed Oct. 15, 1927
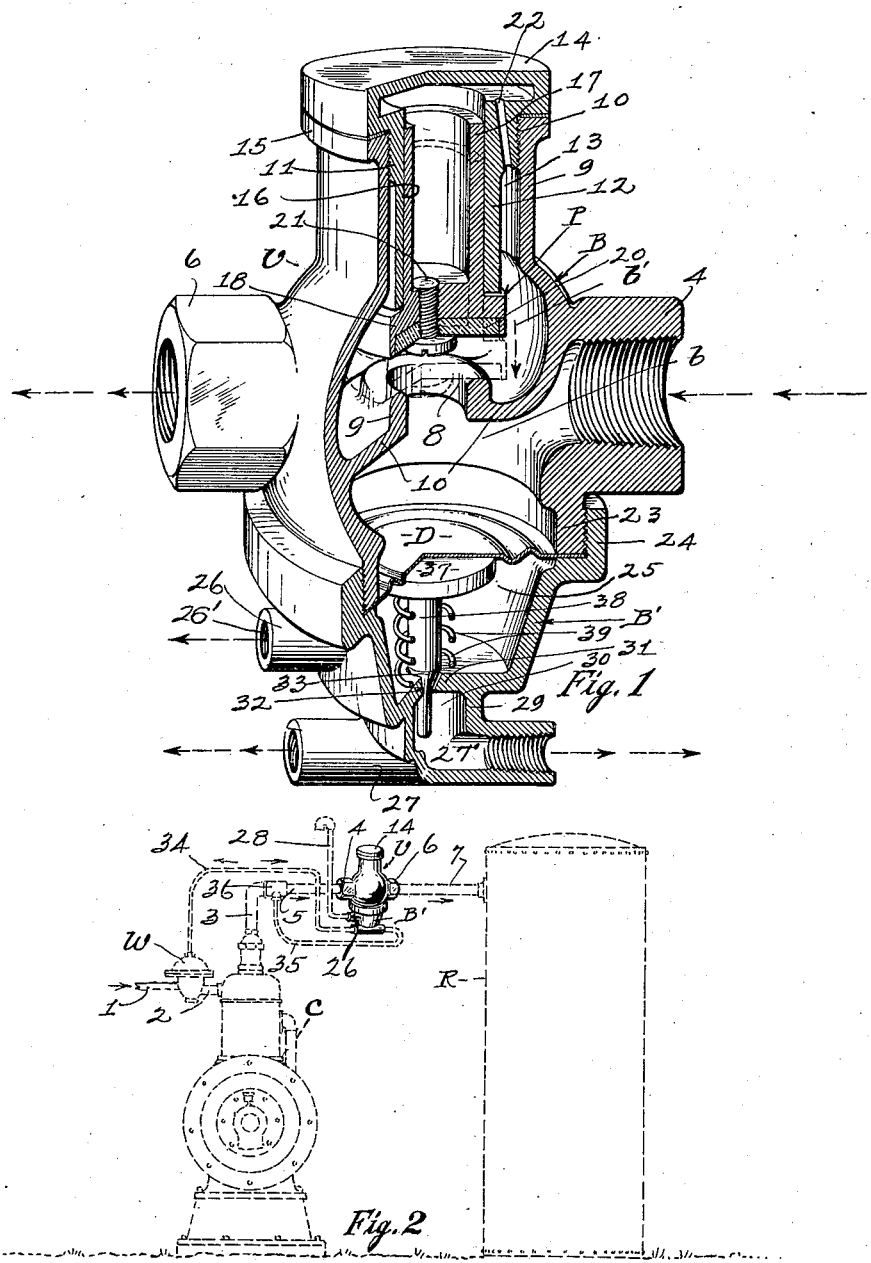
INVENTOR.
Albert A. Smallhouse,
BY
ATTORNEYS.

Patented May 10, 1932

1,857,666

UNITED STATES PATENT OFFICE

ALBERT A. SMALLHOUSE, OF LOS ANGELES, CALIFORNIA

COMBINATION CHECK, PILOT AND UNLOADING VALVE FOR COMPRESSED AIR SYSTEMS

Application filed October 15, 1927. Serial No. 226,498.

This invention relates to and has for a main object the provision of a combination check, pilot and unloading valve for compressed air systems, particularly adapted for connection between a water cooled compressor and a compressed air storage tank, but also capable of being used in connection with air cooled compressors as a combined check and unloading valve.

In more detail, the object of my invention is to provide a combination valve adapted to be connected between a compressor and an air storage tank which will serve as a check valve for retaining the pressure in the tank when the compressor is not in operation, and which will additionally serve as an unloading valve for automatically reducing the pressure between the valve and the compressor to atmospheric pressure, so that when starting the compressor the starting operation will not be effected against pressure in the line.

Another object is to provide in a valve of the character mentioned, means for connecting the valve with the usual water valve connected with the water cooling system of a compressor, in such a manner that when the compressor ceases operation the water valve will be automatically operated for discontinuing the supply of water to the compressor.

Other objects may appear as the description progresses.

In the accompanying drawings I have shown a preferred embodiment of my invention, in which:

Fig. 1 is a perspective view of a valve embodying my improvements and shown in section for illustrating the internal arrangement thereof.

Fig. 2 is a view of the valve operably connected with an air compressor and a compressed air storage tank.

Referring particularly to Fig. 2, my improved valve V is adapted to be connected at an intermediate point between an air compressor, shown in broken lines at C, and an air receiver R. The compressor C is of a water cooled type which is usually provided with a water valve W. Said valve is arranged for attachment to the water supply line 1, and is connected with the water cooling jacket of compressor C by means of a nipple 2. Compressor C is usually attached to the receiving tank R by means of a pipe 3. It is desirable that my improved valve V be attached at an intermediate point between the compressor C and air receiver R, and to this end I provide on the body B of the valve, and at one side thereof an internally threaded inlet 4 for connection with a section 5 of the pipe 3. On the opposite side of the body B, I provide an internally threaded outlet 6 for connection with a section 7 of pipe 3 leading to the air receiver R.

The air from the compressor flows through the pipes 3 and 5 and inlet 4, into a central chamber $b$ formed in the body. Said chamber is in communication with an upper chamber $b'$ by means of a central orifice 8 formed in a boss 9 which extends upwardly from a horizontal partition 10 which separates the chambers $b$ and $b'$. Chamber $b'$ communicates with the pipe 7 though the outlet 6. Thus when the compressor is operating the air flows through inlet 4 of the valve into chamber $b$, thence through orifice 8 and through chamber $b'$ to the receiving tank R.

Body B is provided with an upwardly extended neck 9 which is threaded at 10 to receive a portion 11 of a cylinder 12 which extends downwardly through the portion 13 of chamber $b'$ and depends substantially into said chamber $b'$. The cylinder 12 is provided with a flanged top 14 which abuts a flange 15 formed on the top of portion 9. The cylinder 12 is bored at 16 to slidably receive a hollow stem 17 of a piston valve P, which has an enlarged head 18 on the lower end thereof disposed above the passage 8 in the partition 10.

Piston P may be provided with a suitable gasket or packing disc 20 which may be held thereon by means of a screw 21. Said disc is adapted to engage the upper end of boss 9 for closing communication between the chambers $b$ and $b'$ when and as described hereinafter.

Cylinder 12 is provided with a restricted passage 22 in the upper portion thereof for affording communication between the chamber $b'$ and the bore 16 thereof, for the purpose of balancing the pressures on opposite sides of the head of the piston P.

Body B has a lower extension 23 which is externally threaded and adapted to receive a telescoping portion 24 of a detachable body member B'. Said member B' has a chamber 25 therein which is closed against communication with the chamber $b$ by means of a diaphragm D which is held, as shown in Fig. 1, between the members B and B'. Chamber 25 has an outlet 26 with a passage 26' therein which may be threaded to receive a vent pipe 28 to the atmosphere.

The lower end of member B' is provided with a cylindrical extension 29 on the lower end of which is provided a horizontal portion 27 having a passage 27' extending therethrough, and communicating with a vertical passage 30 formed in the portion 29. The passage 30 is separated from the chamber 25 in member B' by means of a horizontal partition 31, in which a conical valve seat 32 is centrally formed for receiving a needle-valve 33, which serves to regulate communication between the chambers 25 and 30.

One end of the portion 27 is connected by means of a pipe 34 with the upper portion of water valve W on the compressor, while the other end of said portion is connected by means of a pipe 35 with a T 36 attached to the compressor discharge pipe 3. Thus the chamber 30 and passage 27' are in constant communication with the pipe 3, and the air chamber and valve W.

The pressure in the chamber $b$ when the compressor C is in operation is exerted downwardly against the diaphragm D, and said diaphragm engages a head 37 on the stem 38 of valve 33, so that in such case valve 33 is firmly seated in its seat 32 and is so held against the tension of a coil spring 39 which is compressed between the head 37 and partition 31.

When the compressor C is in operation, piston P will be urged upwardly by pressure in chambers $b$ and $b'$, so that air may freely flow from the compressor to the receiver R. When the compressor ceases operation, however, the back pressure in chamber $b'$ will be transferred to the bore 16 of cylinder 12, through the passage 22 for effecting the seating of the piston valve P on the boss 9 over passage 8. In such condition the piston P serves as a check valve to retain the pressure in the receiver R.

Following the operation of the check valve P, the pressure in the chamber $b$ will drop substantially and permit the restoration of the diaphragm valve D to normal position, whereupon the tension of spring 39 will be exerted against the head 37 of valve 33, and said valve will move upwardly and establish communication between chambers 25 and 30.

In such case the pressure in pipe 3 will flow through the pipe 35, passages 27 and 30 into chamber 25, and thence outwardly through chamber 28 to the atmosphere, thus unloading the pressure in the pipe 3 above the compressor.

The water valve W is pressure operated for retaining the valve open during the operation of the compressor, and is tension operated by well known means for automatically closing the valve when the pressure is released.

Thus, by reason of the connection of passage 27 with the water valve W, through the means of pipe 34, when the compressor C is in operation pressure from the pipe 3 will be maintained in passage 27 and pipe 34, which will be directed against the diaphragm of the valve W for permitting water to flow from the supply pipe 1 and nipple 2 to the cooling jacket of the compressor. When the compressor ceases operation, however, the pressure in pipe 3 being relieved, as hereinbefore described, the pressure in pipe 34 will also be relieved and the water valve will be automatically closed.

It will be obvious that the diaphragm D having a substantially greater surface than the lower end of valve 33, the greater pressure in chamber $b$ will hold the valve 33 closed during the operation of the compressor.

It will be observed that I have provided a simple, effective and economical combination valve, capable of being readily installed in a compressed air system, for the purposes described.

What I claim is:

1. A valve mechanism comprising an inlet and an outlet, separate chambers connected with said inlet and said outlet, a valve for regulating communication between said chambers, a third chamber permanently closed against communication with said other chambers, and open to the atmosphere, means for connecting said third chamber with a pressure line, said chamber being normally closed to pressure from said line, and means operable when pressure in said inlet chamber reaches a point below normal, whereby pressure in said pressure line may be relieved through said third chamber.

2. A valve mechanism including a body having an inlet and an outlet, separate chambers in communication therewith, pressure operated means for regulating communication between said chambers, a third chamber permanently closed against communication with said inlet chamber, and open to the atmosphere, a valve in said third chamber, means for connecting a pressure line with said third chamber, and means cooperating with said valve when the pressure in said inlet chamber reaches a point below normal pressure for operating said valve to open communication between the pressure line and the atmosphere, for the purpose described.

3. A valve of the character described, having separate inlet and outlet chambers, a partition separating said chambers and provided with an orifice therein for affording communication between the chambers, the inlet chamber arranged for connection with a pressure line and the outlet chamber arranged for connection with an air receiver, a third chamber adjacent the inlet chamber and permanently closed against communication with said inlet chamber, said third chamber being open to the atmosphere, means for connecting said third chamber with a pressure line, a valve in the outlet chamber normally closing the orifice in said partition and opened by pressure from the inlet chamber, and means for applying pressure to said valve for closing communication between the inlet and the outlet chambers when pressure in the inlet chamber is reduced to a point below normal, and means operable thereupon for relieving pressure in the pressure line through said third chamber.

4. A valve of the character described, having separate inlet and outlet chambers, a partition separating said chambers and provided with an orifice therein for affording communication between the chambers, the inlet chamber being arranged for connection with a pressure line and the outlet chamber arranged for connection with an air receiver, a third chamber adjacent the inlet chamber and permanently closed against communication with said inlet chamber, said third chamber being open to the atmosphere, means for connecting said third chamber with a pressure line, a valve in the outlet chamber normally closing the orifice in said partition and opened by pressure from the inlet chamber, and means for applying pressure to said valve for closing communication between the inlet and the outlet chambers when pressure in the inlet chamber is reduced to a point below normal, and means operable thereupon for relieving pressure in the pressure line through said third chamber, including a pressure operated diaphragm interposed between said inlet chamber and said third chamber and a valve operable by said diaphragm to close the communication between the pressure line and said third chamber, and being operable when pressure is relieved to open the pressure line to the atmosphere.

5. A valve mechanism including a body having an inlet and an outlet, separate chambers in communication therewith, pressure operated means for regulating communication between said chambers, a third chamber permanently closed against communication with the inlet chamber and open to the atmosphere, a valve in said chamber, a diaphragm separating said third chamber from the inlet chamber and operable by pressure for closing said valve, said third chamber having a pressure line connected therewith whereby when pressure in the inlet chamber reaches a point below normal pressure said valve is operated for opening the pressure line to the atmosphere.

6. A valve mechanism including a body having an inlet and an outlet, separate chambers communicating with said inlet and outlet, a partition separating said chambers, and provided with an orifice therein, a valve in said outlet chamber disposed over said orifice for regulating communication between the inlet and outlet chambers, said valve operable by pressure from the inlet chamber to open said orifice and operable by pressure from the outlet chamber to close said orifice, a third chamber permanently closed against communication with said inlet chamber and open to the atmosphere, a valve in said chamber, means for connecting a pressure line with said third chamber, and means co-operating with said valve when the pressure in said inlet chamber reaches a point below normal pressure for operating said last mentioned valve to open the pressure line to the atmosphere.

7. A valve comprising a central body having a partition therein subdividing the body into two separate chambers, one of said chambers having an inlet and the other having an outlet, said partition having an orifice affording communication between said chambers, a cylinder on said body adjacent said outlet chamber, a valve slidable in said cylinder over and for regulating the opening of said orifice, means for applying pressure to opposite sides of said valve whereby pressure from the inlet chamber will open and pressure from the outlet chamber will operate said valve to close said orifice, a vent connected with said valve and arranged for connection with a pressure line, and pressure operated means for normally closing said vent when an operating pressure is maintained in the inlet chamber, and for opening said vent when the pressure in the inlet chamber is reduced to a point below normal pressure.

8. A valve comprising a body having a central partition therein provided with an orifice and forming separate inlet and outlet chambers on opposite sides of the partition, a detachable cylinder mounted on said body and extended into said outlet chamber, a valve slidably held in said cylinder over and for regulating the opening of said orifice, means for applying pressure from said inlet and said outlet chambers respectively to opposite sides of said piston for opening and closing said orifice, a pressure line connected with said valve, and pressure operated means for regulating the opening and closing of said pressure line to the atmosphere.

9. A valve comprising a body having a central partition therein provided with an orifice and forming separate inlet and outlet chambers on opposite sides of the partition, a detachable cylinder mounted on said body and extended into said outlet chamber, a valve slidably held in said cylinder over and for regulating the opening of said orifice, means for applying pressure from said inlet and said outlet chambers respectively to opposite sides of said piston for opening and closing said orifice, a pressure line connected with said valve, and pressure operated means for regulating the opening and closing of said pressure line to the atmosphere, said last mentioned means including a pressure operated diaphragm and a spring operated valve, said diaphragm operating against the tension of said spring to close said valve, and further operated by the tension of said spring to open said valve.

ALBERT A. SMALLHOUSE.